2,979,464
PERBORATE GRANULATION

Horst Pistor, Rheinfelden, Germany, assignor to Deutsche Gold- und Silber-Scheideanstalt vormals Roessler, Frankfurt, Germany No Drawing. Filed Nov. 4, 1957, Ser. No. 694,108

Claims priority, application Germany Nov. 9, 1956

11 Claims. (Cl. 252—99)

The present invention relates to an improved process for granulating perborate or perborate containing compositions.

In the granulation of perborate compositions upon a technical scale a number of factors must be taken into consideration which are of significance both to the producer as well as the consumer. For example, it is important that the products do not dust during handling and that they dissolve rapidly when they are used in washing compositions. Furthermore, it is of importance that the particle size of the perborate conforms with that of the other components of the washing compositions or other mixtures containing such perborate in order to minimize separation of the perborate from such mixtures.

In granulation it is difficult to avoid losses in active oxygen whether it be during the actual granulation procedure or during subsequent storage. In addition, perborate granulation products should possess a satisfactory rate of solution and at the same time also possess sufficient mechanical strength in order that they can be incorporated in washing agents, bleaching assistants and the like without crumbling or suffering too great an abrasion loss.

According to the invention it was found that perborate or perborate containing mixtures could be granulated with only very low active oxygen losses to produce mechanically stable granules of satisfactory and in many instances excellent rates of solution by subjecting the starting material in the presence of small quantities of water to a vigorous mechanical treatment with rapidly rotating stirring arms or blades or other equivalent means and either simultaneously or preferably subsequently subjecting it to a treatment in a rotary drum at an elevated temperature to dry the granulated product to the desired moisture content.

It is already known that dry finely divided materials, such as carbon black, dyes and pigments, can be compressed by subjecting them to vigorous mechanical treatment to produce loose aggregates which crumble to the original particle size when admixed with other materials. It was, however, completely unexpected that vigorous mechanical treatment would be suited for the granulation of perborate or perborate containing mixtures as perborate, in view of its crystalline structure, has a completely different behavior than the finely divided and usually amorphous carbon black and the like. It was rather to be expected that the mechanical treatment would lead to a comminution of the perborate. However, contrary to expectations, it was found according to the invention that excellent results can be obtained by granulating perborate by the process according to the invention.

The perborate employed according to the invention can, for example, be sodium perborate, tetrahydrate still moist from centrifuging or corresponding mixtures with a free water content of 3 to 35%, preferably 5 to 15% (water of crystallization is disregarded). As a consequence, it is not necessary to predry the perborate before the granulation process according to the invention. After the drying, the granules produced in general possess satisfactory mechanical strength. When special mechanical requirements must be met, binding agents can be added. When dry perborate is used as a starting material it can be moistened before or during the granulation procedure with water or aqueous solutions of binding agents.

Materials such as, for example, starch, agar-agar, gelatine or vegetable or animal glues can be employed as binding agents. Sodium carboxy methyl cellulose gums are particularly suited as binding agents as they also possess a marked attrition action upon the granules produced when they are contacted with water during use. Agents having such attrition action are, for example, easily soluble inorganic or organic salts which, because of rapid dissolution or swelling, cause the individual granules to disintegrate and thereby hasten the dissolution of the perborate in aqueous liquids. Soluble carbonates, especially bicarbonates such as sodium bicarbonate, phosphates, sulfates or chlorides, are suitable attrition agents. A high rate of solubility is of special importance in washing agents as the impatience of the housewife must be taken into consideration. Also, insufficient dissolution of the washing agent in the washing fluid can also lead to damage to laundry in view of localized excesses of active oxygen.

The stability of the active oxygen in perborate granulates can be improved by the addition of known stabilizers such as magnesium silicate, sodium stannate, Trilon B (sodium ethylene diamine tetra acetate) and the like. Water glass which also acts as a binding agent can also be used but is less suited for other reasons.

The process according to the invention is not only suitable for the production of granulated perborate products of normal poured weight but is also suitable for the production of granulated products of low poured weight. It is also possible to vary the size of the granules within certain limits.

In addition to the binding agents and attrition agents indicated other materials, such as wash active substances (detergents), bleaching assistants and the like, can also be incorporated in the perborate product during its granulation. For example, soaps, such as sodium stearate and sodium palmitate, synthetic detergents, such as lauryl sulfate and dodecylbenzene sulfonate, and the like can be incorporated in the granulated perborate products according to the invention. In this way intermediate products or also bleaching agents and finished washing agents can be produced in a free flowing form having a uniform grain size in which the components do not segregate. Of course, it is also possible to incorporate optical bleaches or certain finely divided oxides, such as vapor phase silica (silica produced by a gas phase reaction), to prevent caking which might, for example, be caused by hygroscopic components in the granulated products or to dust them therewith.

Apparatus suitable for the vigorous mechanical treatment required for the granulation process according to the invention are, for example, described in U.S. Patents Nos. 2,306,698 and 2,120,540. While the products are preferably dried in a rotating drum after their granulation by treatment with rapidly rotating stirring arms or blades, it is also possible to drum and dry the products gradually as they pass through the mechanical agitation apparatus. Preferably the drying of the granulated product is effected under conditions that it is not heated above about 60° C. (sodium perborate tetrahydrate melts at 63° C.). Expediently, the temperature of the drying product is not over 45 to 50° C. in order to reduce the loss of active oxygen to a minimum.

Preferably the binding agent, such as starch, agar-agar, gelatine, glues and carboxy methyl cellulose, are employed in quantities not over 5% by weight of the granulated product and preferably are employed in a quantity of about 0.5%. When readily water soluble attrition agents, such as sodium bicarbonate, sodium sulfate and the like, are incorporated in the granulated product the quantity preferably does not exceed 30% and expediently is about 20%. The quantity of stabilizer which can be added is comparatively small and as a rule does not exceed a few percent and, for example, can amount to about 0.5 to 2% in the case of magnesium silicate.

The following examples will serve to illustrate several embodiments of the process according to the invention:

EXAMPLE 1

Sodium perborate tetrahydrate still wet from centrifuging and containing 7% of adherent water was mixed with 0.5% by weight of magnesium silicate and then was introduced into one end of the granulating apparatus similar to that shown in U.S. Patent No. 2,306,698 which consisted of a vessel about ½ meter in diameter and 2 meters long in which a shaft with a large number of stirring arms rotating at 200 r.p.m. was provided. The ends of the stirring arms were spaced about 2 cm. from the walls of the vessel. A 3% aqueous solution of sodium carboxy methyl cellulose was sprayed on the perborate being heated in the apparatus until the quantity of solution added was 8% by weight with reference to the perborate and such mixture was vigorously agitated by the rapidly rotating stirring arms. The shape and arrangement of the stirring arms were such in addition to providing the vigorous agitation of the perborate and additions they also served to transport the agitated mixture through the vessel. The perborate left the other end of the apparatus in a still moist but already crumby form and then immediately passed through a rotating drying drum rotating at 4 r.p.m. in which it was dried and simultaneously homogenized. Drying gases were passed countercurrently to the drying product, their entering temperature was about 100° C. and the rate of passage was such that the dried product leaving the drying drum did not exceed 45° C. Of course, hotter or cooler drying gases, for example, between 80–150° C., could be used as long as their ratio to the product being dried is such that the temperature of the drying product itself does not exceed 60° C., preferably 50° C.

The resultant granulated product had an average particle size of 0.5 to 1.5 mm. and possessed good resistance to abrasion.

Other hydrates can naturally be used instead of the tetrahydrate. It is also possible to vary the grain size produced within certain limits, for example, by changing the free water content, the supply of heated drying air, the various additions, the r.p.m. of the rotating stirring arms (or respectively the type and intensity of the mechanical treatment).

EXAMPLE 2

Sodium perborate tetrahydrate together with 20% of sodium bicarbonate and 2% of magnesium silicate were introduced into a two stage granulating apparatus. The first stage of such apparatus consisted of a three meter long closed trough in which a shaft carrying a large number of stirring arms rotated at 250 r.p.m. While the mixture was in such first stage it was sprayed with a 3% aqueous sodium carboxy methyl cellulose solution and thoroughly mixed therewith until the free water content of the mixture was 18%. The mixture was then introduced into the second stage consisting of a vessel similarly shaped to that of the first stage which is again provided with a shaft carrying a large number of stirring arms but rotating at a higher r.p.m. than in the first stage, namely, 300 r.p.m. The product leaving the second stage was in granulated form and this was then homogenized and dried in a rotary drum drier as in Example 1.

The resulting dry granules not only possessed excellent mechanical stability but also dissolved very rapidly and completely in water.

In this case the stirring arms of the first stage have a round cross section, while those of the second stage are oval.

EXAMPLE 3

A mixture of sodium perborate tetrahydrate still moist from centrifuging, 20% of sodium sulfate and 1% of magnesium was granulated and dried as described in Example 1.

The granulated product obtained also had good resistance to mechanical abrasion and good solubility. This product was especially suited as a component of washing agents produced from synthetic detergents, such as, for example, lauryl sulfate.

The granulated products of the aforegoing examples were tested as to their rate of solubility in comparison with normal crystallized sodium perborate tetrahydrate. In such tests 5 g. of a sieved off granulated fraction having a particle size of 0.5 to 0.75 mm. were introduced into 500 cc. of water at 20° C. with light stirring.

The following table gives the percentage of the perborate which had dissolved after the periods indicated:

*Table*

|  | Percent perborate dissolved after the indicated number of minutes | | | | | |
|---|---|---|---|---|---|---|
|  | 1 | 2 | 3 | 4 | 6 | 8 |
| Perborate crystals | 42 | 70 | 85 | 91 | 98 | 98.5 |
| Granules of Example 1 | 35 | 62 | 78 | 87 | 98 | 100 |
| Granules of Example 2 | 88 | 95 | 98.5 | 100 | | |
| Granules of Example 3 | 76 | 89 | 94 | 97 | 99 | 100 |

In coarser fractions of the granulated product, such as, for example, would be employed in washing agents, the rate of solubility increases still further in favor of the granulated products.

EXAMPLE 4

Sodium tetraperborate tetrahydrate still moist from centrifuging containing 10% of adherent water was introduced into one end of a granulating apparatus consisting of a closed trough about 3 meters long in which a shaft provided with a large number of stirring arms rotated at 250 r.p.m. While the perborate was in said vessel it was sprayed with water until its free water content was 15%. The perborate was vigorously agitated and transported through the vessel by the rotating stirring arms. The perforate left the other end of the granulating apparatus in a moist but granulated form and was then homogenized and dried in a drum drier as in Example 1. While the starting perborate had an average grain size of 0.05–0.3 mm., the granulated product had an average grain size of 0.3 to 1.2 mm.

I claim:

1. A process for the granulation of finely divided sodium perborate tetrahydrate containing material to produce granules of an average particle size between 0.3 and 1.5 mm. which comprises subjecting such material in moistened state to the vigorous action of a plurality of rotating stirring arms rotating at a speed of at least 200 r.p.m. until a moist granular product is obtained and drying the moist granular product in a rotary drum drier.

2. The process of claim 1 in which such moist perborate material contains 3 to 35% of free water.

3. The process of claim 1 in which such moist perborate material contains 5 to 15% of free water.

4. The process of claim 1 in which an aqueous liquid is supplied to the perborate material while it is subjected to the vigorous action of the rotating stirring arms.

5. The process of claim 1 in which said perforate containing material which is granulated contains in addition to the perborate readily soluble material selected from the group consisting of alkali metal bicarbonates, carbonates, sulfates and phosphates.

6. The process of claim 1 in which said perborate containing material which is granulated contains a binding agent selected from the group consisting of agar-agar, starch, gelatine, glues and carboxy methyl cellulose gums.

7. The process of claim 1 in which said perborate containing material which is granulated contains a stabilizer for the perborate selected from the group consisting of magnesium silicate, sodium stannate, water glass and sodium ethylene diamine tetra acetate.

8. The process of claim 1 in which said perborate containing material which is granulated contains sodium bicarbonate in an amount up to 30%, sodium carboxy methyl cellulose in an amount up to 5% and magnesium silicate in an amount up to 2%.

9. The process of claim 1 in which said perborate containing material which is granulated contains about 20% of sodium bicarbonate, about 0.5% of sodium carboxy methyl cellulose and up to 2% of magnesium silicate.

10. The process of claim 1 in which said perborate containing material which is granulated contains sodium sulfate in an amount up to 30%, sodium carboxy methyl cellulose in an amount up to 5% and magnesium silicate in an amount up to 2%.

11. The process of claim 1 in which said perborate containing material which is granulated contains about 20% of sodium sulfate, about 0.5% of sodium carboxy methyl cellulose and up to 2% of magnesium silicate.

References Cited in the file of this patent

UNITED STATES PATENTS

| | | |
|---|---|---|
| 1,965,304 | Adler | July 3, 1934 |
| 1,978,953 | McKeown | Oct. 30, 1934 |
| 2,034,361 | Sutton | Mar. 17, 1936 |
| 2,145,015 | Seaton | Jan. 24, 1939 |
| 2,308,992 | Mertens | Jan. 19, 1943 |
| 2,367,971 | Spiegler | Jan. 23, 1945 |
| 2,706,178 | Young | Apr. 12, 1955 |
| 2,874,123 | Schaafsma et al. | Feb. 17, 1959 |
| 2,876,200 | Strain et al. | Mar. 3, 1959 |
| 2,895,916 | Milenkevich et al. | July 21, 1959 |

FOREIGN PATENTS

| | | |
|---|---|---|
| 848,071 | Germany | Sept. 1, 1952 |